（12） United States Patent
Lee et al.

(10) Patent No.: US 8,947,077 B2
(45) Date of Patent: Feb. 3, 2015

(54) ROTARY POSITION SENSOR

(75) Inventors: Joong K. Lee, Chatham (CA); Lingmin Shao, Ridgetown (CA); Ryan Elliott, Chatham (CA)

(73) Assignee: KSR IP Holdings LLC., Wilmington, DE (US)

( * ) Notice: Subject to any disclaimer, the term of this patent is extended or adjusted under 35 U.S.C. 154(b) by 294 days.

(21) Appl. No.: 13/469,234

(22) Filed: May 11, 2012

(65) Prior Publication Data

US 2012/0293166 A1 Nov. 22, 2012

Related U.S. Application Data

(60) Provisional application No. 61/487,755, filed on May 19, 2011.

(51) Int. Cl.
*G01B 7/30* (2006.01)
*G01D 5/20* (2006.01)

(52) U.S. Cl.
CPC .................................... *G01D 5/2046* (2013.01)
USPC ................. 324/207.25; 324/207.23

(58) Field of Classification Search
CPC ............................... G01D 5/2046; G01B 7/30
USPC .............. 324/207.15–207.19, 256, 257, 546, 324/343, 654; 702/150, 151, 94, 95; 73/634, 114.26, 314, 54.33
See application file for complete search history.

(56) References Cited

U.S. PATENT DOCUMENTS

| | | | |
|---|---|---|---|
| 5,003,260 A | 3/1991 | Auchterlonie | |
| 6,259,249 B1 | 7/2001 | Miyata | |
| 7,319,319 B2 * | 1/2008 | Jones et al. | 324/207.24 |
| 7,482,803 B2 | 1/2009 | Lee et al. | |
| 7,538,544 B2 | 5/2009 | Lee | |
| 2007/0194782 A1* | 8/2007 | Lee | 324/207.17 |
| 2008/0174302 A1* | 7/2008 | Lee et al. | 324/207.16 |
| 2011/0181302 A1 | 7/2011 | Shao et al. | |

* cited by examiner

*Primary Examiner* — Tung X Nguyen
*Assistant Examiner* — Alesa Allgood
(74) *Attorney, Agent, or Firm* — Gifford, Krass, Sprinkle, Anderson & Citkowski, P.C.

(57) ABSTRACT

A rotary position sensor having a transmitter coil excited by a high frequency signal source. A first and second receiver coil, each having at least two oppositely wound loops, are rotatably positioned electrically 90 degrees relative to each other. The receiver coils are positioned so as to be inductively coupled with the transmitter coil while a coupler constructed of an electrically conductive material is rotatably positioned over and inductively coupled with the first and second receiver coils. The outputs from the first and second receiver coils are coupled through a high pass filter and a low pass filter, respectively, thus creating a 90° phase shift in the resultant signals. These signals are summed together and coupled as an input signal to a PWM circuit together with a signal from the transmitter coil.

8 Claims, 2 Drawing Sheets

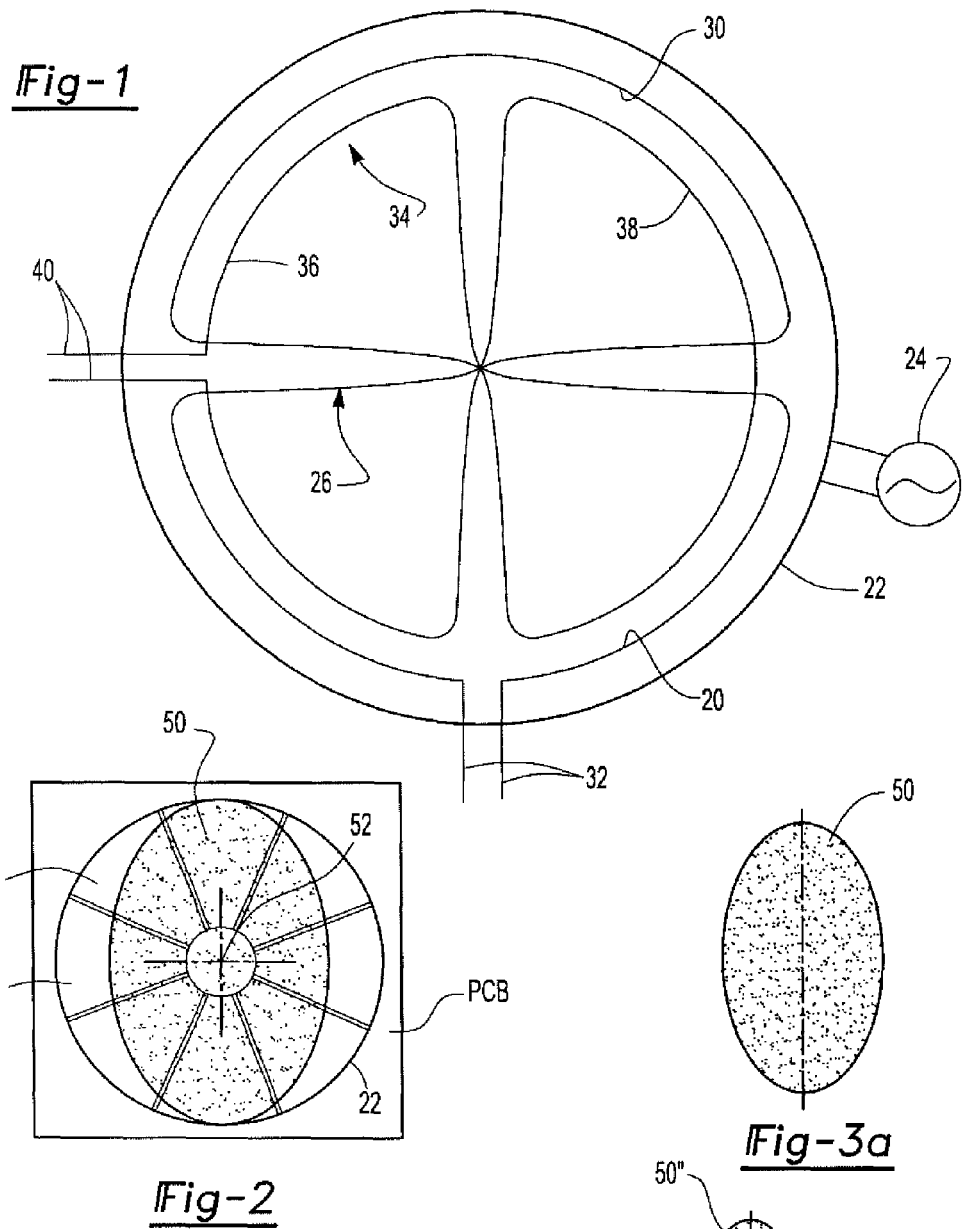
Fig-1
Fig-2
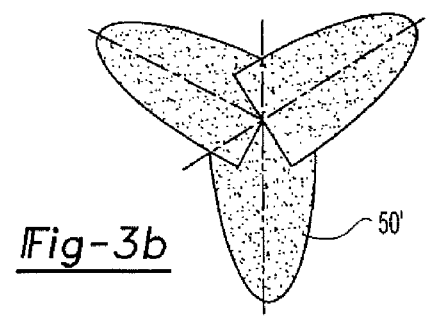
Fig-3b
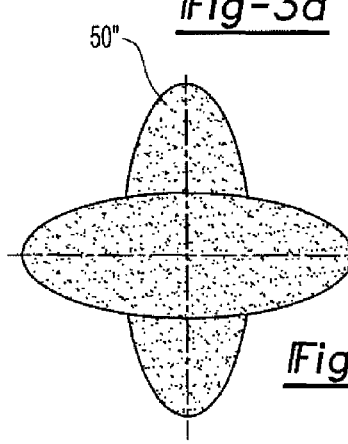
Fig-3a
Fig-3c

ROTARY POSITION SENSOR

CROSS-REFERENCE TO RELATED APPLICATIONS

This application claims priority of U.S. Provisional Patent Application 61/487,755 filed May 19, 2011, the contents of which are incorporated herein by reference.

BACKGROUND OF THE INVENTION

I. Field of the Invention

The present invention relates to rotary position sensors.

II. Description of Related Art

There are many different situations in which the rotary position of a sensor must be determined. For example, most modern automotive vehicles include a throttle position sensor which detects the rotational position of the throttle plate and generates an electrical output signal representative of that position. That electrical signal is then electrically connected to an engine management unit which controls the overall operation of the internal combustion engine for the vehicle as a function of the position or depression of the throttle.

Typically, the previously known throttle position sensors include a rotatable body which attaches to the throttle plate shaft so that the body and throttle plate shaft rotate in unison with each other. Consequently, the rotatable position of the sensor is indicative of the rotational position of the throttle plate shaft and thus of the depression of the throttle.

In one type of previously known throttle position sensor, a transmitter coil is formed on a printed circuit board (PCB) and excited by a high frequency signal, e.g. 4 megahertz. A receiver coil is also formed on the PCB and is arranged in multiple segments around the PCB board wherein each segment is oppositely wound from the adjacent segments.

A coupler is then rotatably mounted relative to the PCB board so that the coupler is planar and overlies a portion of the PCB board. The coupler is constructed of an electrically conductive material so that rotation of the coupler relative to the PCB board varies the inductive coupling between the transmitting coil and receiving coil and thus varies the voltage output from the receiver coil. Consequently, the voltage output on the receiver coil is proportional to the relative rotational position of the coupler and, since the coupler is rotatably connected to the throttle shaft, of the rotational position of the throttle shaft and thus the depression of the throttle.

These previously known throttle position sensors, however, have more than two sets of receiving coils. Hence, they are more complex in construction. Furthermore, the resolvers have been bulky in construction.

A still further limitation of the previously known throttle position sensors is that it was difficult to achieve high accuracy in certain situations. For example, the output from the receiver coil may vary as a function of temperature which, in turn, creates an inaccuracy in the output signal from the receiver coil. Similarly, minor manufacturing tolerances, such as the position of the coupler relative to the PCB board and/or tilting of the coupler, also resulted in inaccurate output from the receiver coil.

SUMMARY OF THE PRESENT INVENTION

The present invention provides a position sensor which eliminates the above-mentioned disadvantages of the previously known devices and allows the principle of the resolver to be implemented in a PCB with two receiving coils and a simple signal conditioner.

In brief, the position sensor of the present invention comprises a PCB board which, like the previously known position sensors, included a transmitter coil formed on the PCB. The transmitter coil is energized by a high frequency signal, such as a sinusoidal signal, of about 4 megahertz.

Unlike the previously known position sensors, two receiver coils are also formed on the PCB board. Each coil includes two angularly adjacent and oppositely wound sections. Furthermore, the two receiver coils are angularly offset from each other by a known angular distance, preferably a geometric angle of a magnitude such that the electrical phase angle, i.e. electrical angle, is electrically 90 degrees.

An elliptical coupler is then rotatably mounted relative to the PCB board so that the coupler overlies at least a portion of the transmitter coil and two receiver coils. This coupler, which is rotatably coupled to the throttle axle, varies the inductive coupling between the transmitter coil and both of the receiver coils in a varying amount which is proportional to the rotational position of the coupler. Furthermore, since the two receiver coils are geometric angle offset in such amount that the electrical angle offset by electrically 90 degrees are generated relative to each other, the output signal from the first receiver coil varies as a function of $\sin \theta$ while the output from the second receiver coil varies as a function of $\cos \theta$ where $\theta$ equals the angular position of the coupler. Consequently, such a system provides an in-phase signal of cos and a quadrature signal of sin which are orthogonal and may each be decoded in a Cartesian decoder.

In the preferred embodiment of the invention, in order to decode the output signals from the two receiver coils, a phase shift of electrically 90 degrees is introduced between the two receiver outputs. This is preferably accomplished by introducing a +45 degree phase shift in the output from one receiver coil and a −45 degree phase shift in the output from the other receiver coil. These two outputs are then multiplied together, preferably after temperature compensation, to produce the output signal $-\cos(\omega t+\theta)$ where $\theta$ equals the angular position of the coupler and thus of the throttle axle. This signal is then combined with a signal $\cos(\omega t)$ from the transmitter coil are coupled as an input to a pulse width module such that the duty cycle from the pulse width module is directly proportional to $\theta$.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a diagrammatic view illustrating a preferred embodiment of the present invention when the signal coils printed in PCB. In comparison of the existing resolver the signal coils are not printed on PCB.

FIG. 2 represents only the 2-pole system, and a more than 2-pole extension can be easily made according to following supporting page. When the forward wound conductive wire can have any number of polarity and the backward one has the same number of polarity and they are printed on the same plane without overlapping areas.

FIGS. 3a, 3b, and 3c are views illustrating different configurations for the coupler;

DETAILED DESCRIPTION OF A PREFERRED EMBODIMENT OF THE PRESENT INVENTION

Figure 4:
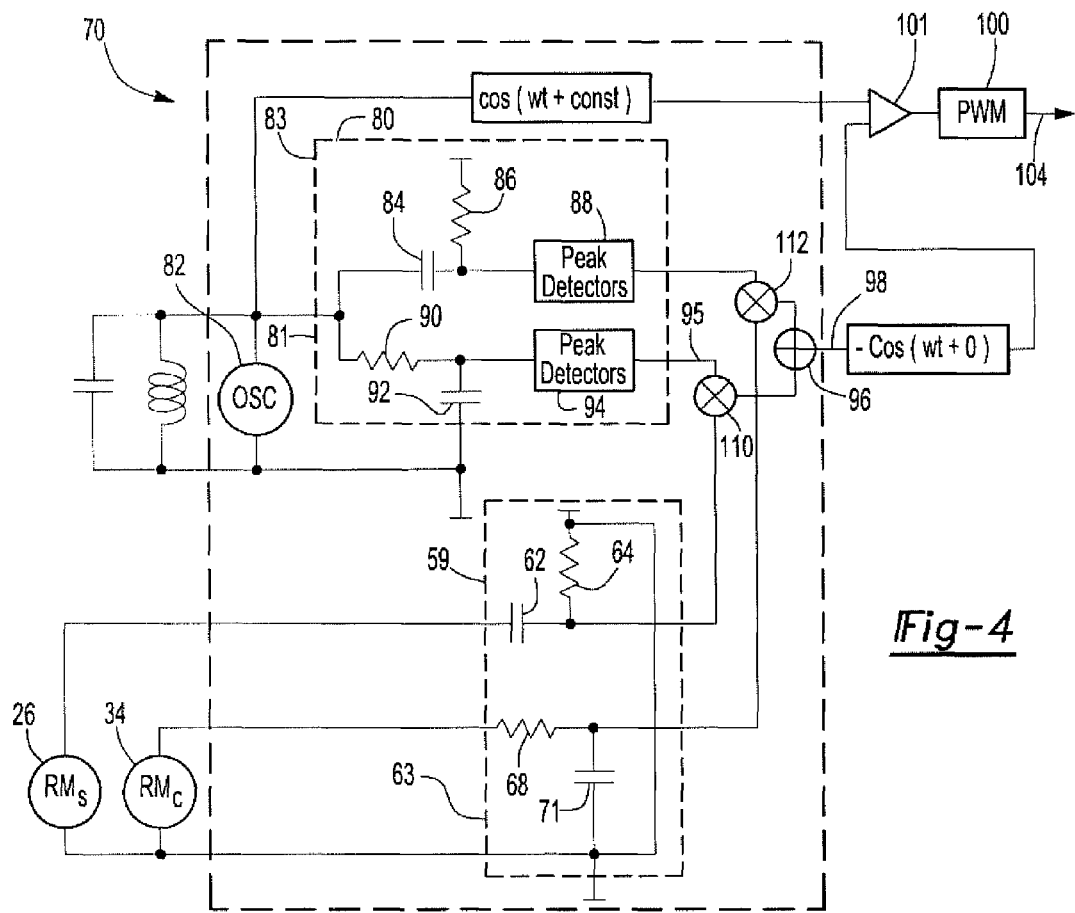
FIG. 4 is a schematic view illustrating the preferred embodiment of the present invention.

With reference first to FIG. 1, a preferred embodiment of a portion of the sensor 20 of the present invention is shown and includes a circular transmitter coil 22 formed on a printed circuit board (PCB). The transmitter coil 22 is energized by a high frequency sine wave from a source 24 of about 4 megahertz. Other frequencies, of course, may alternatively be used.

A first receiver coil 26 having at least two oppositely wound loops 28 and 30 is also formed on the PCB 25. The first receiver coil 26 includes two ends 32 which form the output signal from the receiver coil 26.

Similarly, a second receiver coil 34 having at least two oppositely wound loops 36 and 38 is also formed on the PCB 25. The ends 40 of the second receiver coil 34 form the output signal from the second receiver coil 34.

The loops of the first receiver coil 26 and second receiver coil 34 are rotated relative to each other by electrically 90 degrees. As such, upon energization of the transmitter coil 22, the sinusoidal output on the outputs or ends 32 and 40 of the first receiver coil 26 and second receiver coil 34, respectively, are orthogonal to each other, i.e. offset by electrically 90 degrees in phase so that the first receiver coil 26 produces a sine signal and the second receiver coil 34 produces a cosine signal.

With reference to lawyer's FIG. 2, an elliptical coupler 50 is rotatably mounted about an axis 52 to the PCB. This axis 52 is aligned with axis of both receiver coils 26 and 34 as well as the transmitter coil 22. The role of the elliptic coupler is to generate as pure as possible sinusoidal signal from the receiver coils 26 and 34, so that the signal in the form of phase 3 is not distorted. Whenever the coupler deviates from ellipsoidal circle, the resulting signal deviates from sinusoidal.

With reference to FIGS. 3a, 3b, and 3c, different configurations for the coupler 50 are shown having two lobes, three lobes, and four lobes respectively. In practice the number of lobes for the coupler 50 is selected to maximize the resolution of the sensor over the maximum angle range of the sensor. For example, if the maximum angle measured by the sensor is 180 degrees, a two lobe coupler 50 shown in FIG. 3a is selected. However, if the maximum angle measured by the sensor is 120 degrees, a three lobe coupler 50' shown in FIG. 3b is selected which provides better resolution than a two lobe coupler. Likewise, if the maximum angle measured by the sensor is electrically 90 degrees, a four lobe coupler 50" shown in FIG. 3c is selected which provides even better resolution, and so forth.

Since the receiver coils 26 and 34 exhibit low source impedance voltage source, the output of a high pass filter has electrically 90 degrees phase angle difference from a low pass filter when the passive components used in both filters have the same value per type e.g., capacitor and resistor. With reference now to FIG. 4, the voltage signal from the first receiver coil 26 is coupled as an input signal to a high pass filter 59 formed by a capacitor 62 and resistor 64. Similarly, the voltage signal from the second receiver coil 34 is coupled as an input signal to a low pass filter 63 formed by a resistor 68 and capacitor 71. Furthermore, the output signals from the two filters 59 and 63 form quadrature signals ready for summation to generate the signal θ. However, each signal of the quadrature signal pair has magnitude deviation due to both temperature and frequency because of impedance of capacitor and resistor varies with temperature and frequency.

The signals 26 and 34 pass through different passive filters, and the each output Q and I from filters 59 and 63, respectively, is differently affected by temperature and frequency. Because the output Q passes through the high pass filter 59 whereas the other output I passes through the low pass filter 63, the two outputs have different temperature and frequency impacts.

A temperature and frequency compensation is implemented using a matching low pass filter 81 formed by a capacitor 92 and resistor 90 and high pass filter 83 formed by a capacitor 84 and resistor 86. Specifically, the output from an oscillator 82 passes through the high pass filter 81 and the low pass filter 83, and the two branch outputs from the filters 81 and 83 have different temperature and frequency impacts. Assuming that the low pass filter and high pass filter have consistent characteristics for temperature and frequency, when the output Q from high pass filter 59 is multiplied by a multiplier 110 with the output 95 of the low pass filter 81, then the output of the multiplier 110 has the same characteristics as the output of a multiplier 112 which multiplies outputs of the other low and high pass filters 63 and 83, respectively, thus providing automatic temperature compensation.

The resistors and capacitors in all filters are chosen all the same characteristics in order to maintain consistent low pass and high pass filter characteristics. For example all the resistors have one impedance value with the same characteristics while all the capacitors do the same, so that the multiplication of the outputs of corresponding filter pairs is consistent. Preferably, all these passive components are from the same process, such as CMOS process, on the same die.

In order to facilitate multiplication, peak detectors 88 and 94 are connected in series between the filters 83 and 81 and the multipliers 112 and 110, respectively, which generate an almost DC signal so that the output of multipliers 110 and 112 can maintain the main frequency co. In addition this frequency cc is used to set the time stamp to generate PWM signal through PWM generator by comparing the two time stamps, one from signal line and the other from oscillator 82.

The oscillator 82 illustrated in FIG. 4 is preferably the same oscillator as the transmitter source 24 (FIG. 1). However, other types of oscillators, such as a crystal or piezoelectric oscillator, may alternatively be used.

The outputs from the two multipliers 110 and 112 form quadrature signals and outputs from the two quadrature multipliers 110 and 112 are summed together at a summing circuit 96. Consequently, an output 98 from the summing circuit 96 is equal to −cos(ωt+θ) where θ equals the angle of the throttle position sensor. This output signal 98 is coupled as an input signal to a pulse width modulation module 100 via a Schmitt trigger 101.

The pulse width modulation module 100 also receives an input of cos(ωt+const) which is taken from the input to the peak detector 88. The constant const is preferably set to zero so that the phase shift between the input 98 and the input 102 to the pulse width module is directly proportional to the phase shift between these two signals. The pulse width module 100, in a conventional fashion, generates a signal on its output 104 which is a pulse width modulated signal having a duty cycle directly proportional to θ. Any conventional algorithm may then be utilized to compute θ.

Figure 5:
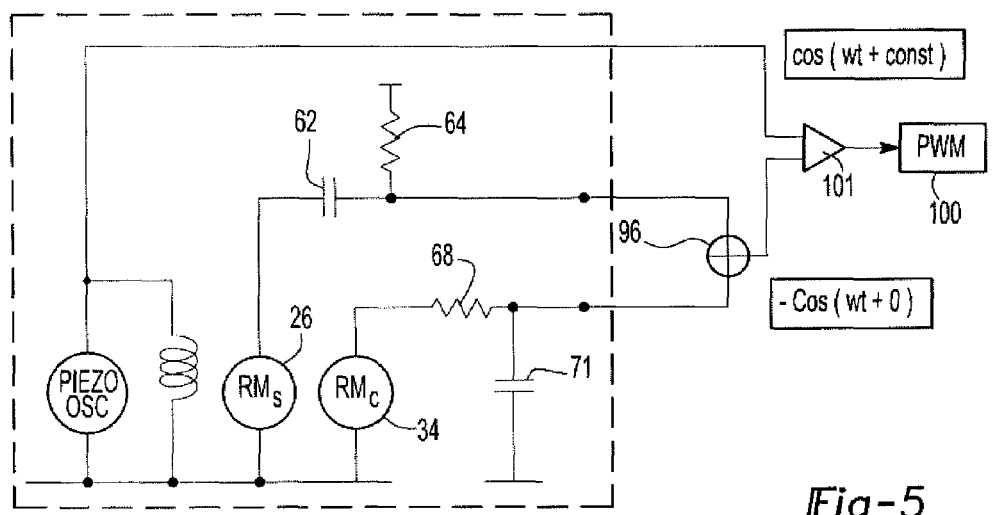
FIG. 5 is a schematic view showing an alternative embodiment.

With reference to FIG. 5, a simplified schematic is shown for use in situations where the frequency is stable, such as a piezo oscillator, and the resistance and capacitance do not vary appreciably. This allows the temperature and frequency compensation circuitry to be eliminated which yields a simple, inexpensive yet accurate position resolver. This is achieved in part by using a stable oscillator as the driving frequency.

From the foregoing, it can be seen that the present invention provides a simple yet unique rotational position sensor which, by using two receiver coils with electrical phase angle offset by electrically 90 degrees and preferably an elliptical coupler, is able to generate high accuracy, temperature compensated angle sensing up to the full 180 degrees. And also with adjusting of the number of polarity the system can measure small angle with high resolution. Furthermore, the present invention provides a simplified system for a Cartesian decoder with quadrature oscillator using passive elements from which the quadrature signals are derived. Automatic temperature compensation and driving frequency compensation are also achieved.

We claim:

1. A rotary position sensor comprising:
   a transmitter coil adapted to be excited by a high frequency signal source,
   a first receiver coil having at least two oppositely wound loops, said first receiver coil being inductively coupled with said transmitter coil,
   a second receiver coil having at least two oppositely wound loops, said second receiver coil being rotatably positioned electrically 90 degrees relative to said first receiver coil and inductively coupled with said transmitter coil,
   a coupler constructed of an electrically conductive material and having at least two lobes, said coupler rotatably positioned over and inductively coupled with said first and second receiver coils,
   a signal summer having two inputs and an output,
   said first receiver coil electrically connected through a low pass filter to one input of said signal summer,
   said second receiver coil electrically connected through a high pass filter to the other input of said signal summer,
   said output of said signal summer electrically connected to a pulse width modulation circuit which produces an output with a duty cycle proportional to the angle of rotation of said coupler.

2. The sensor as defined in claim 1 wherein said pulse width modulation circuit also receives the output signal from said high frequency signal source.

3. The sensor as defined in claim 2 wherein said output signal from said high frequency signal source and said output from said signal summer are connected as inputs to a Schmitt trigger having its output connected as an input signal to said pulse width modulation circuit.

4. The sensor as defined in claim 1 wherein said high pass filter and said low pass filter are each constructed from passive components.

5. The sensor as defined in claim 4 wherein said high pass filter and said low pass filter each comprises a resistor and a capacitor.

6. The sensor as defined in claim 1 and comprising a temperature compensation circuit connected as input signals to said signal summer.

7. The sensor as defined in claim 6 wherein said temperature compensation circuit comprises:
   a second high pass filter and a second low pass filter, said high frequency source connected as an input to both said second high pass filter and a second low pass filter,
   a first and a second signal multiplier, each signal multiplier having two inputs and one output,
   an output from said first low pass filter and an output from said second high pass filter connected as input signals of said first signal multiplier,
   an output from said second low pass filter and an output from said first high pass filter connected as input signals of said second signal multiplier,
   said output signals from said signal multipliers connected as input signals to said signal summer.

8. The sensor as defined in claim 7 and comprising a pair of peak detectors, one peak detector being connected in series between said second low pass filter and said second high pass filter and their respective multipliers.

* * * * *